United States Patent [19]

Gates

[11] Patent Number: 4,768,753

[45] Date of Patent: Sep. 6, 1988

[54] CHAIN TIGHTENER

[76] Inventor: Donald R. Gates, R.R. #3, P.O. Box 8, Kohanko Site, Quesnel, B.C., Canada

[21] Appl. No.: 924,303

[22] Filed: Oct. 29, 1986

[30] Foreign Application Priority Data

Oct. 29, 1985 [CA] Canada .................................. 494154

[51] Int. Cl.⁴ ........................... B25B 25/00; B66F 3/24
[52] U.S. Cl. .................................. 254/228; 24/68 CT; 254/93 R
[58] Field of Search ............... 254/93 R, 93 VH, 201, 254/228, 231; 24/68 CT, 68 TT, 70 TT

[56] References Cited

U.S. PATENT DOCUMENTS

| | | | |
|---|---|---|---|
| 2,100,564 | 11/1937 | Mandl et al. | 24/68 CT |
| 2,383,061 | 8/1945 | Johnson | 254/228 |
| 3,016,603 | 1/1962 | Rutland | 254/93 R X |
| 3,150,859 | 9/1964 | Payne | 254/228 |
| 3,411,748 | 11/1968 | Fortune | 254/228 |
| 3,946,988 | 3/1976 | Kehren | 254/93 R X |
| 4,157,171 | 6/1979 | Hasselås | 254/228 X |
| 4,201,367 | 5/1980 | Konen | 254/231 |

Primary Examiner—Stuart S. Levy
Assistant Examiner—Joseph J. Hail, III
Attorney, Agent, or Firm—Seed and Berry

[57] ABSTRACT

A chain tightener to tighten chains on a tractor or vehicle tire. The tightener comprises first and second spreader members, a frame consisting of a base portion and a longitudinal member extending between the base portion and the first spreader member. A longitudinal reinforcement member is mounted between the first spreader member and the base portion of the frame. The second spreader member reciprocates on the longitudinal member. A hydraulic cylinder is mounted and exerts force between the second spreader member and the base portion of the frame.

6 Claims, 1 Drawing Sheet

CHAIN TIGHTENER

INTRODUCTION

This application relates to a clamping member and, more particularly, to a clamping member used for tightening heavy-duty tire chains used on equipment such as log skidders or loaders used in snow, wet or mud type operating conditions.

BACKGROUND OF THE INVENTION

Heavy-duty operating equipment used on logging or other severe operating environments is used year-round and is subject to great differences in weather. In snow, mud or other difficult operating conditions, the equipment will have chains installed on the tires to assist the movement of the vehicle by allowing greater traction to be obtained. It is important to properly install the chains on the tires to ensure that the pressure is consistent and that no undue wear is caused by the chains not being tightened satisfactorily.

Previous chain tighteners have suffered from heavy weight which affects portability, lack of safe operating characteristics which have previously mandated that the operator stand quite close to the tightener and unreliable operation caused by subjecting the chain tightener to overloading and, therefore, bending or breakage.

SUMMARY OF THE INVENTION

According to the present invention, there is disclosed a chain tightener comprising frame means, first spreader means connected to the said frame means, second spreader means slidably mounted on said frame means and operable to be moved relative to said first spreader means, reinforcement means connected between said first spreader means and said frame means, and expansion means mounted between said second spreader means and said frame means.

BRIEF DESCRIPTION OF THE SEVERAL VIEWS OF THE DRAWINGS

An embodiment of the invention will now be described, by way of example only, with the use of drawings in which.

DESCRIPTION OF SPECIFIC EMBODIMENT

Figures 1, 2, 3:
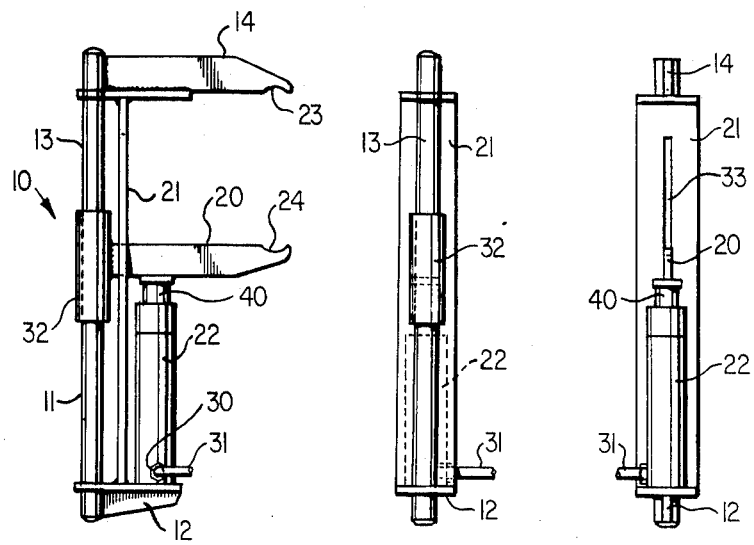
FIG. 1 is a side view of the chain tightener according to the invention.
FIG. 2 is an end view, taken from the left hand side of FIG. 1.
FIG. 3 is an end view, taken from the right hand side of FIG. 2.

Referring now to the drawings, a chain tightener is generally shown at 10 in FIG. 1. It comprises a frame 11, having a base portion 12 and a longitudinal member 13, a first spreader means or top jaw 14, a second spreader means or sliding jaw 20, a reinforcement member or strong back 21 and an expansion member in the form of a hydraulic cylinder 22.

The top jaw 14 and sliding jaw 20 have hook contacting members 23, 24 respectively, on the portion of the top jaw 14 and sliding jaw 20 outwardly from the longitudinal member 13. The strong back 21 is positioned between the longitudinal member 13 and the hook contacting members 23, 24, respectively.

The hydraulic cylinder 22 is mounted between the sliding jaw 20 and the base portion of the frame 11. It is also located between the hook contacting members 23, 24 and the strong back 21. A port 30 in the hydraulic cylinder 22 allows the ingress and egress of hydraulic fluid which is provided through a hose 31 connected to a manually operated hand pump (not shown) or to the hydraulic system of the vehicle on which the chain tightener 10 is being used.

The sliding jaw 20 has a sleeve 32 that is reciprocally movable on longitudinal member 13 under the influence of hydraulic cylinder 22. The sliding jaw 20 extends outwardly from the sleeve 32 and through a longitudinal groove 33 in the strong back 21 as more clearly seen in FIG. 3.

OPERATION

Figure 4:
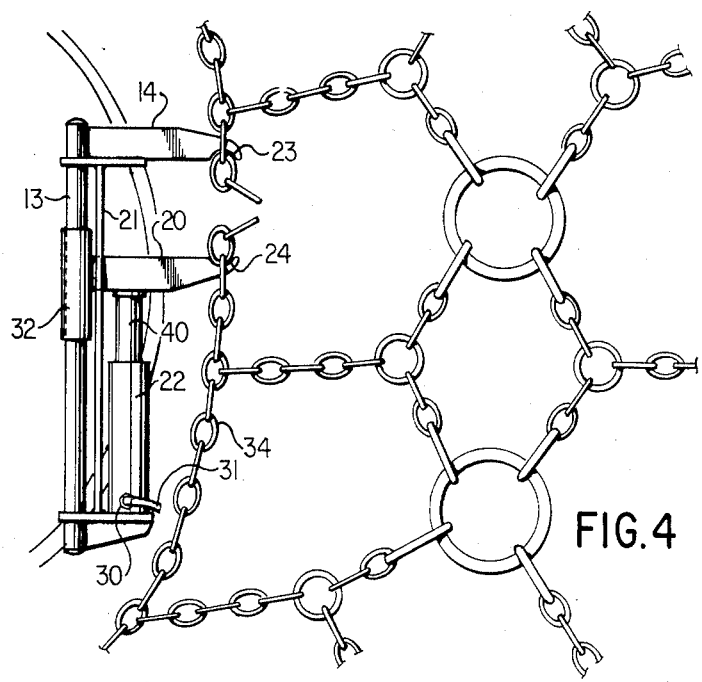
FIG. 4 illustrates the chain tightener in an operating position.

In operation, the chain tightener 10 is manually mounted with the hook contacting members 23, 24 in contact with two links on the chain 34 as illustrated in FIG. 4 which it is intended will be pulled towards each other thereby tightening the chain 34. The hose 31 is connected either to a manual pump (not shown) or to the hydraulic system of the vehicle (not shown) and the rod 40 of the cylinder 22 extends from cylinder 22 and acts on sliding jaw 20 to slidingly move sleeve 32 toward top jaw 14 in longitudinal groove 33 of strong back 21 until the chain 34 is adequately tightened. The fasteners (not shown) on the chain 34 can then be closed, the hydraulic fluid is allowed to drain from the hydraulic cylinder 22 and the chain tightener 10 can be removed from the chain and used elsewhere.

It is contemplated that the hydraulic cylinder 22 may be located on either side of the strong back 21. In either event, the hydraulic cylinder 22 will not be subject to moment loading, but, rather, to axial loading. Similarly, the strong back 21 could be positioned on either side of the longitudinal frame member 13, it not being essential that the strong back 21 be located between the hook contacting members 23, 24 although it is a preferred embodiment that the strong back 21 be so located as illustrated so that it may carry a substantial portion of the moment loading being created between the top jaw 14 and the sliding jaw 20 and the base portion 12.

Various other modifications may be made in the invention and the embodiments described should be taken as illustrative only and not as limiting the scope of the invention as defined in the accompanying claims.

I claim:

1. A chain tightener comprising a base, a first spreader, a rigid reinforcement member extending between said first spreader and said base, a guide rod extending between said base and said first spreader, a second spreader, an expansion member mounted between said second spreader and said base, said second spreader being slidably mounted on said guide rod and within a longitudinal aperture in said reinforcement member, the width of said longitudinal aperture being of a dimension closely approximating the width of said second spreader so as to allow said slidable movement of said second spreader.

2. A chain tightener as in claim 1 wherein said reinforcement member has an axis substantially parallel to the axis of said guide rod.

3. A chain tightener as in claim 2 wherein each of said first and second spreader have oppositely located hook contacting members, said rigid reinforcement member being located between said hook contacting members and said guide rod.

4. A chain tightener as in claim 3 wherein said expansion member is located between said hook contacting members and said reinforcement member.

5. A chain tightener as in claim 4 wherein said expansion member is a hydraulic cylinder.

6. A chain tightener as in claim 5 wherein said hydraulic cylinder is manually operable.

* * * * *